United States Patent
Sermon et al.

(10) Patent No.: US 6,882,956 B2
(45) Date of Patent: Apr. 19, 2005

(54) LAPPING PLATE TOPOGRAPHY SYSTEM

(75) Inventors: Carl Francis Sermon, Los Gatos, CA (US); Terry Fredrick Banitt, Altura, MN (US); John Patrick Hagen, Rochester, MN (US); Roger Willard Johnson, Harmony, MN (US); George McDonald Moorefield, II, Raleigh, NC (US); Thomas Donald Weller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 10/283,884

(22) Filed: Oct. 30, 2002

(65) Prior Publication Data

US 2004/0088137 A1 May 6, 2004

(51) Int. Cl.[7] .............................................. G01B 21/00
(52) U.S. Cl. ...................... 702/168; 702/167; 702/157; 702/166
(58) Field of Search ............................ 702/168, 75–77, 702/94, 95, 105, 155, 150–153, 157, 158, 163, 170, 159, 172, 189, 190, 198, 33, 36, 65, 97, 113, 166, 167; 451/5, 57, 55, 53, 65, 54, 1, 8, 905; 29/603.16, 603.17, 603.12; 250/559.19, 559.24, 559.26, 554.27, 559.29, 559.37; 438/7, 10, 14, 16, 17; 700/119–121, 187, 195; 216/59–61, 84–86; 74/813 R, 815; 324/661, 662, 658, 667, 671, 686, 690; 33/503–505, 556, 557, 558.01, 559–561, 700

(56) References Cited

U.S. PATENT DOCUMENTS 5,749,769 A * 5/1998 Church et al. .................. 451/5
5,948,468 A * 9/1999 Sweatt et al. ................ 247/140
6,587,794 B1 * 7/2003 Maznev ........................ 702/28

OTHER PUBLICATIONS

IBM Lapping Plate Topographer Manual, pp. 1–29, Apr. 1992.

* cited by examiner

Primary Examiner—Hal Wachsman
(74) Attorney, Agent, or Firm—Rabin & Berdo, PC (57) ABSTRACT

A lapping plate topography system includes a measuring apparatus for measuring the surface of a lapping plate, and an analysis apparatus for analyzing and presenting the data resulting from such measurements. The measurement apparatus has a non-contacting capacitive probe for measuring a height of the surface of the lapping plate, a rotary arm assembly for moving the probe in an arc over the surface of the lapping plate, and a spindle assembly for rotating the lapping plate about its center. The computer-based analysis apparatus is operable to input from the measurement apparatus the measured height at a plurality of data points on the surface of the lapping plate, calculate Fourier transform harmonic coefficients based on the plurality of measured heights, calculate surface ripple coefficients based on the calculated Fourier transform harmonic coefficients, and output the calculated surface ripple coefficients to an appropriate display device.

20 Claims, 8 Drawing Sheets

FIG. 1

(PRIOR ART)

LAPPING PLATE TOPOGRAPHY SYSTEM

BACKGROUND OF THE INVENTION

1. Field of the Invention

The invention relates to a system for measuring the surface topography of a lapping plate, and for analyzing and presenting the data resulting from such measurements.

2. Background Information

Figure 1:
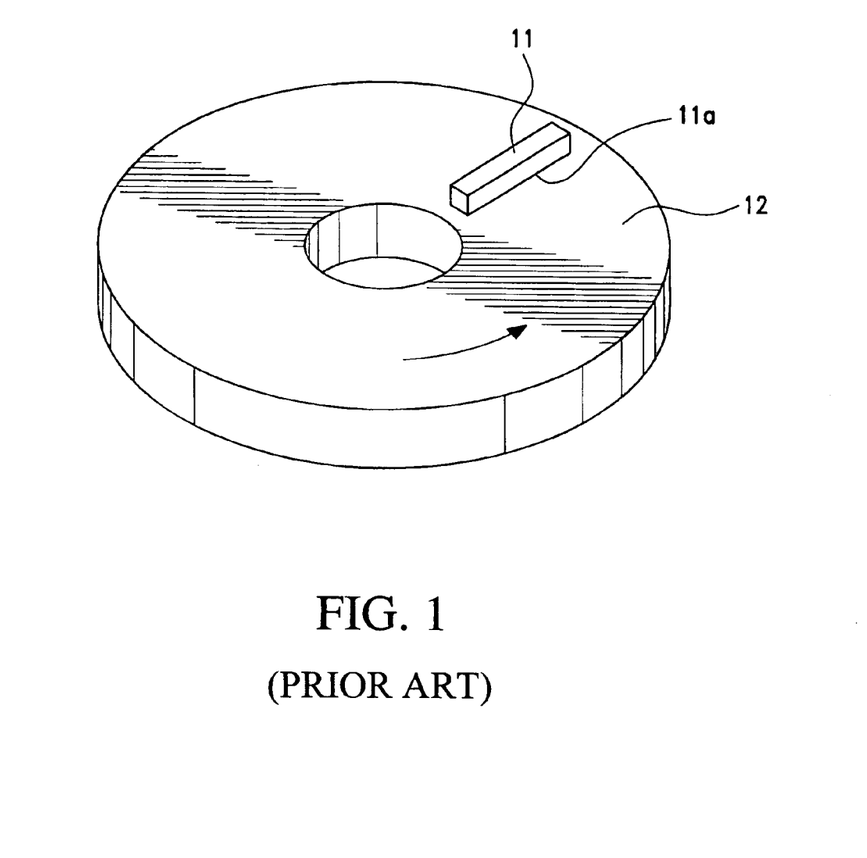
FIG. 1 shows a typical lapping operation used in manufacturing semiconductor devices.

Lapping plates are often used in the process of manufacturing semiconductor devices to accurately remove excess material from device surfaces. FIG. 1 shows a typical application in which the air bearing surface 11a of a strip of thin-film magnetic heads 11, which are being manufactured for use in hard disk drives, is being lapped to set the height of the heads' magnetic sensors within specified limits. The lapping plate 12, rotating at constant speed and impregnated with fine abrasive particles, mechanically removes material from surface 11a at a controlled rate. A holding device (not shown) precisely maintains the position of the magnetic heads 11 in contact with the lapping plate 12 during the lapping process.

A lapping plate that would be used in manufacturing thin-film magnetic heads is typically made with an aluminum base to which a layer of a tin alloy is bonded. The surface of the tin alloy is then machined ("planerized") to achieve a flat, smooth surface. Prior to use, the tin alloy face of the lapping plate is impregnated ("charged") with fine abrasive particles, typically diamond dust. The charging process is accomplished by rotating the lapping plate while dripping a liquid slurry of the abrasive particles onto the surface of the tin layer and pressing in the particles with a charging ring.

The quality of a component surface being lapped is affected by the presence or absence of irregularities in the surface of the lapping plate. Such irregularities can, for example, cause scratches in the air-bearing surface of a magnetic head that will result in aerodynamic instability as the head "flies" over the surface of a hard disk and consequently, result in unreliable read/write operation of the hard disk memory.

In order to measure the surface topology of a lapping plate and determine its suitability for use, the lapping plate is placed in a measurement apparatus that typically has a spindle for rotating the lapping plate, and a linear actuator for moving a probe radially across its surface. The probe is able to obtain samples of the surface height at different distances from the center of the plate, and at different angular positions of the plate. Because of the degree of precision required in positioning the probe, the measuring apparatus may be quite expensive. Typically, the data obtained from these measurements must be processed off-line in order to obtain the surface characteristics. These methods do not automatically yield a characterization of the lapping plate surface in terms of a set of parameters that can be used in gauging the quality of products that will be produced using the lapping plate, and hence, are not capable of readily generating a simple pass/fail determination for the operator making the measurements.

SUMMARY OF THE INVENTION

It is, therefore, a principle object of this invention to provide a lapping plate topography system.

It is another object of the invention to provide a lapping plate topography system that solves the above-mentioned problems.

These and other objects of the present invention are accomplished by the lapping plate topography system disclosed herein.

In an exemplary aspect of the invention, a lapping plate topography system is comprised of a measuring apparatus for measuring the surface topography of a lapping plate, and an analysis apparatus for analyzing and presenting the data resulting from such measurements. The measurement apparatus has a non-contacting capacitive probe for measuring a height of the surface of the lapping plate, a rotary arm assembly for moving the probe in an arc over the surface of the lapping plate such that the probe can be positioned at a plurality of radial distances from the center of the lapping plate, and a spindle assembly for rotating the lapping plate about its center such that the probe can be positioned over a plurality of angular positions on the lapping plate. The computer-based analysis apparatus is operable to input from the measurement apparatus the measured height at a plurality of data points on the surface of the lapping plate corresponding to the plurality angular positions and the plurality of radial distances from the center of the lapping plate. The analysis apparatus is further operable to calculate Fourier transform harmonic coefficients based on the plurality of measured heights, calculate surface ripple coefficients based on the calculated Fourier transform harmonic coefficients, and output the calculated surface ripple coefficients to an appropriate display device.

In another aspect of the invention, the probe comprising part of the measurement apparatus is slideably attached to the rotary arm assembly ban actuator that moves the probe toward and away from the surface of the lapping plate in a direction nominally perpendicular to the surface of the lapping plate. Each of the rotary arm assembly, spindle assembly and probe actuator is electrically driven and includes an electrical position sensor, so as to be computer compatible for position control and measurement. Both the rotary arm assembly and spindle assembly preferably rotate on air bearings.

In yet another aspect of the invention the analysis apparatus includes a computable readable medium, and computer programming stored in the medium. The stored programming is configured to be readable from the computer readable medium by a computer to thereby cause the computer to operate so as to input topographic data measured at the plurality of data points on the surface of the lapping plate, calculate Fourier transform harmonic coefficients based on the inputted topographic data, calculate surface ripple coefficients based on the calculated Fourier transform harmonic coefficients, and output the calculated surface ripple coefficients to an appropriate display device. Preferably, the Fourier transform harmonic coefficients are calculated separately for each value of the radial distance from the center of the lapping plate, and each of the surface ripple coefficients is calculated as the root-mean-square of selected ones of the Fourier transform harmonic coefficients. The stored programming is further configured to cause the computer to compare the calculated surface ripple coefficients to stored limit values and output a pass/fail indication based on the comparison. Preferably, stored programming is also configured to cause the computer to apply a correction to the inputted topographic data based on topographic measurements of an optical flat, to determine the shape of the surface of the lapping plate based on a second-order regression analysis of the measured topographic data and output an indication of the shape, to calculate and output a topographical map of the surface of the lapping plate based on the measured topographic data, and to calculate and output A 3-D mesh representation of the surface of the lapping plate.

BRIEF DESCRIPTION OF THE DRAWINGS

FIG. 2b shows an oblique view of the same lapping plate topographer shown in FIG. 2a.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Figure 2A:
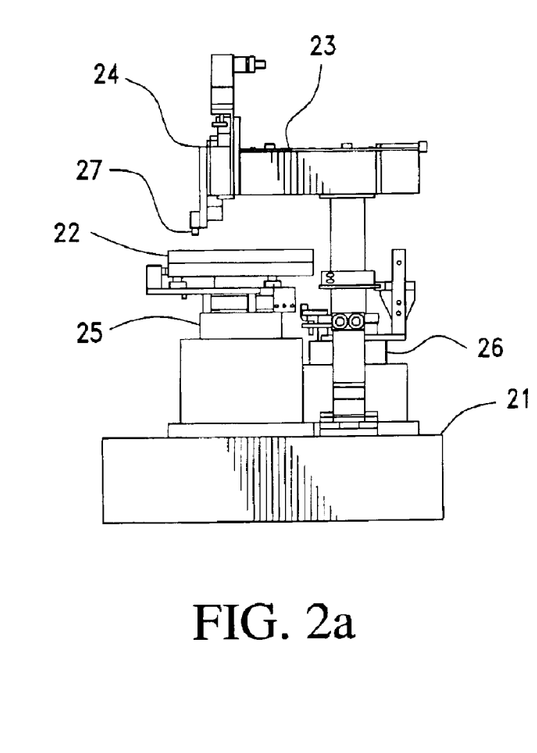
FIG. 2a shows an elevation view of a lapping plate topographer according to the present invention.
Figure 2B:
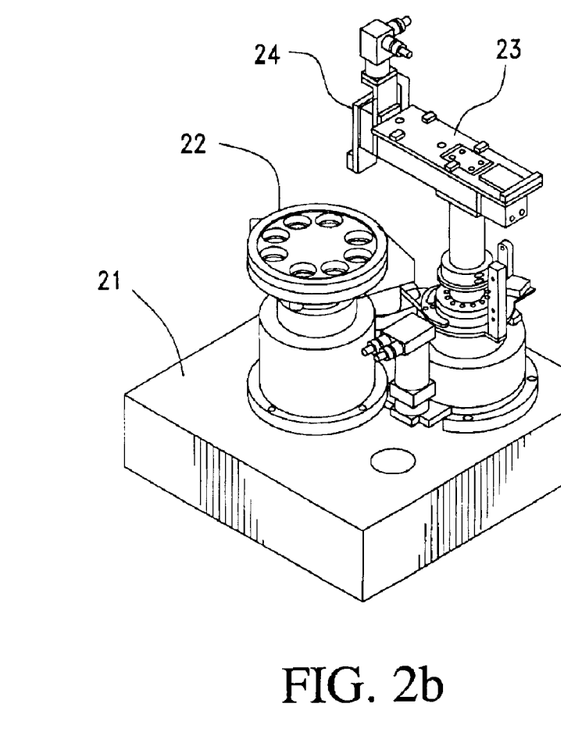

The present invention is directed toward a lapping plate topography system comprising a measurement apparatus for measuring the surface topography of a lapping plate, and an analysis apparatus for analyzing and presenting the data resulting from such measurements. With reference to FIGS. 2a and 2b, the measurement apparatus 20 (also known as a lapping plate topographer) is comprised of a base 21, a spindle assembly 22, a rotary arm assembly 23, and a probe assembly 24. The spindle assembly 22 and the rotary arm assembly 23 are supported by air bearings 25 and 26, respectively. The spindle assembly 22 and the rotary arm assembly 23 are each electrically driven (e.g., by a stepper motor) and an angle encoder on each assembly (not identified) provides angular position information to the analysis apparatus, as further discussed below.

Figure 3A:
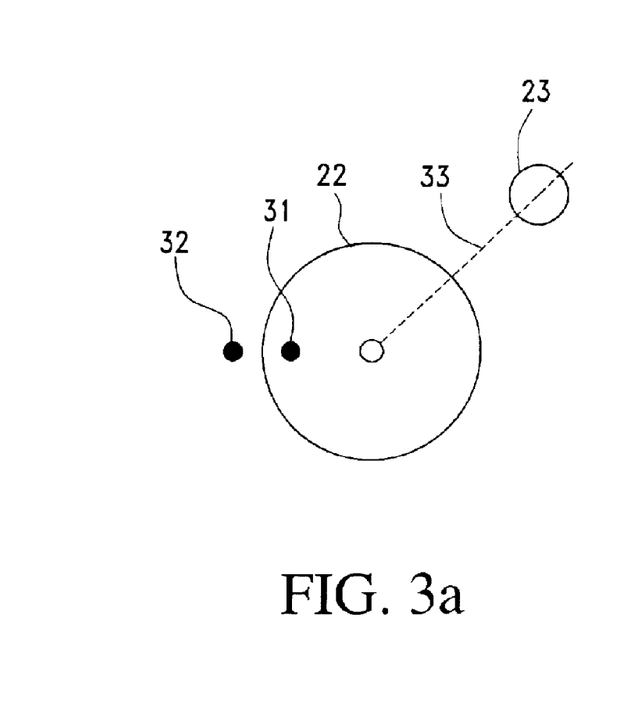
FIG. 3a shows schematically the spindle assembly and the rotary arm assembly of the lapping plate topographer in their respective home positions, according to the present invention.
Figure 3B:
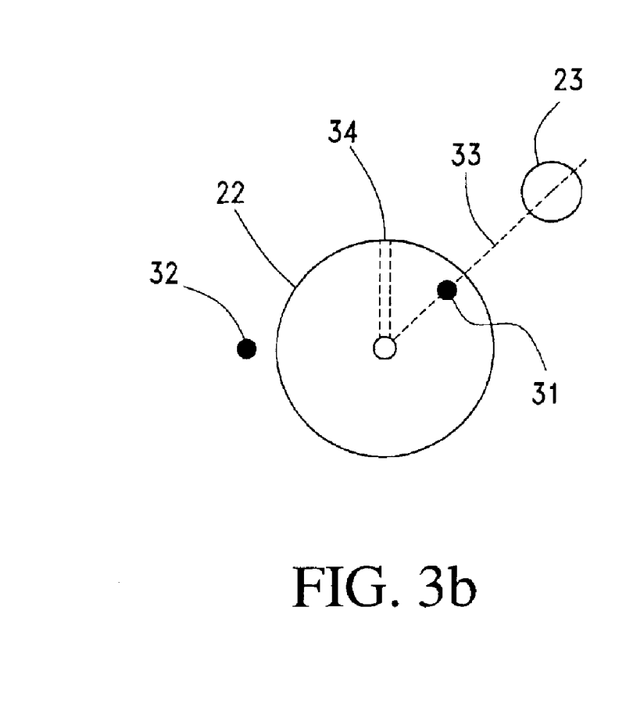
FIG. 3b shows schematically the spindle assembly and the rotary arm assembly in their respective loading positions, according to the present invention.

In use, the lapping plate being measured is loaded onto the spindle assembly 22 and aligned relative to reference flags on the spindle assembly 22 and on the base 21. FIGS. 3a and 3b show the alignment references used in the preferred embodiment. In the home position shown in FIG. 3a, which is the 0 degree reference for the spindle assembly encoder, a home flag 31 on the spindle assembly 22 is aligned with a home flag 32 on the base 21. In the load position shown in FIG. 3b, the home flag 31 is positioned on the line 33 between the rotary arm assembly center of rotation and the spindle assembly center of rotation. Line 33 forms the 0 degree reference for the rotary arm assembly encoder, placing the probe assembly 24 directly over the center of the lapping plate when the rotary arm assembly 23 is in its home position. The lapping plate is loaded onto the spindle assembly 22 such that its reference mark, in this case a drain hole in the edge of the plate, is pointed directly away from the operator.

It should be obvious to a person of ordinary skill in the art, that any other set of 0 degree references for the angular positions of the spindle assembly 22 and the rotary arm assembly 23 would be equally suitable, as long as a reference on the lapping plate being measured bears a known relationship to a reference on the spindle assembly 22.

In the embodiment shown in FIGS. 2a and 2b, the probe assembly 24 is mounted to the end of the rotary arm assembly 23 and includes an electrically-driven linear actuator (not shown) that moves the probe 27—in the Z axis (i.e., parallel to the axis of rotation of the spindle assembly), toward and away from the surface of the lapping plate. A sensor (not shown) measures the Z-axis position of the probe assembly 24. In the loading position, the probe 27 is withdrawn to its highest end of travel. During scanning of the plate surface, the probe 27 is brought close to the plate surface in order to be able to measure the surface height. In the preferred embodiment, a non-contacting capacitive probe is used. The spindle assembly 22 has leveling screws (not shown) around its periphery allowing any tilt in the spindle assembly 22 to be removed prior to measurement so that the surface height measured by the probe stays within a predetermined range. A safety scan of the lapping plate is performed prior to the data scan to check for any out-of-range conditions occurring in the probe data. If the probe data goes out of range, the probe 27 is raised, the spindle is stopped, and the lapping plate is re-leveled.

Any misalignment between the rotation axis of the rotary arm assembly 23 and that of the spindle assembly 22 is reflected in measured probe height data as an offset that increases with distance from the center of the lapping plate. The preferred embodiment has facility for performing a calibration scan in which an optical flat is substituted for the lapping plate and height data is collected for concentric rings on the optical flat as a function of radial distance from the center. The analysis apparatus, discussed below in further detail, performs a second order regression analysis on the height measured in each ring, and stores the coefficients of the regression curve so that a correction can be applied to surface height values measured for lapping plates during later data scans. If $TC_0$ and $TC_1$ are the linear and second order coefficients determined from the calibration scan, then the correction, Dc, to be subtracted from the measured surface height, Dr, is given by:

$$Dc = TC_0 * R + TC_1 * R^2, \quad (1)$$

where R is the radial distance from the center of the lapping plate.

The rotary arm assembly 23 moves the probe 27 in an arc from the center of the lapping plate to its outer edge. At any position of the rotary arm assembly, the radial distance from the center of the lapping plate can be computed from the angular position out of the rotary arm assembly and the known distance from the center of rotation of the rotary arm assembly 23 to the center of rotation of the spindle assembly 22, using simple geometry. The rotary arm assembly 23 is more rugged and less expensive to manufacture than the linear actuator used in prior art measuring apparatus to move the probe in the radial direction.

As earlier noted, the spindle assembly 22, the rotary arm assembly 23 and the Z-axis actuator for the probe assembly 24 are electrically driven. Each is configured to receive command signals and move to a desired position in response to such signals. Also as earlier noted, the spindle assembly 22 and the rotary arm assembly 23 each have an angular position sensor. The outputs of these sensors, as well as the output of the probe 27, comprise the measured raw data for the analysis apparatus of the lapping plate topography system.

Figure 4:
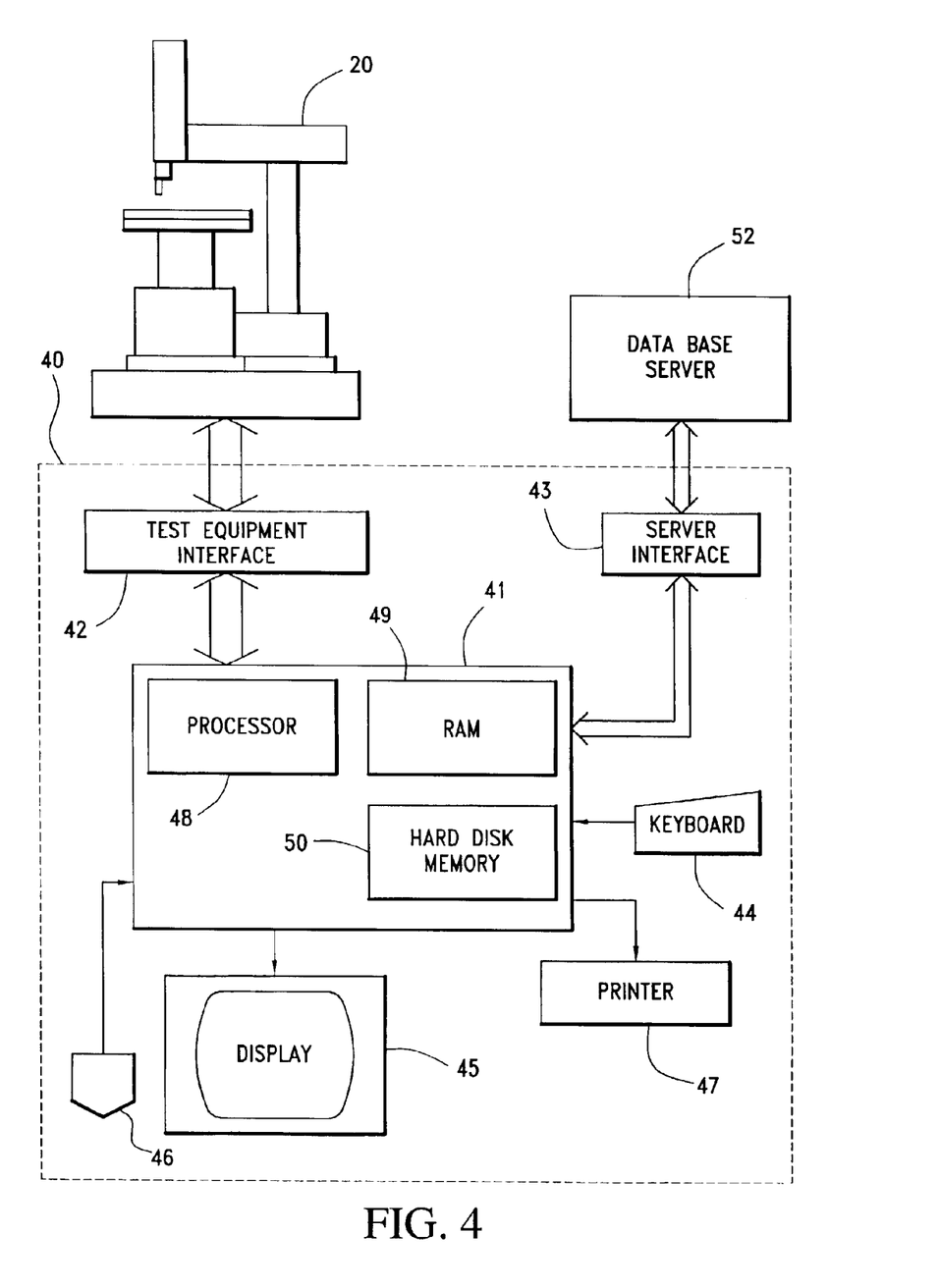
FIG. 4 shows a simplified block diagram of the lapping plate topography system, according to the present invention.

The analysis apparatus 40 of the system, shown in FIG. 4, controls the measurement apparatus 20, receives measured lapping plate data, and analyzes and presents the measured data in a manner that is useful to the system operator. The analysis apparatus is basically comprised of a personal computer (PC) 41 that controls all the functions of the lapping plate topography system, a test equipment interface 42 that sends equipment commands to the measurement apparatus and receives measured lapping plate data, a server interface 43 that is used to send and retrieve processed lapping plate data from a central database server 52, an input device 44, such as a keyboard, that can be used by an operator for inputting required parameters, initiating measurement routines, and calling up processed lapping plate data, and an output display device 45, such as a CRT, for displaying the process data according to a variety of available presentation options. A mouse 46 and a printer 47 are preferably included in the complement of input/output devices for the PC 41. The PC 41 typically includes a processor 48, random access memory (RAM) 49, and hard disk memory 50.

Figure 5:
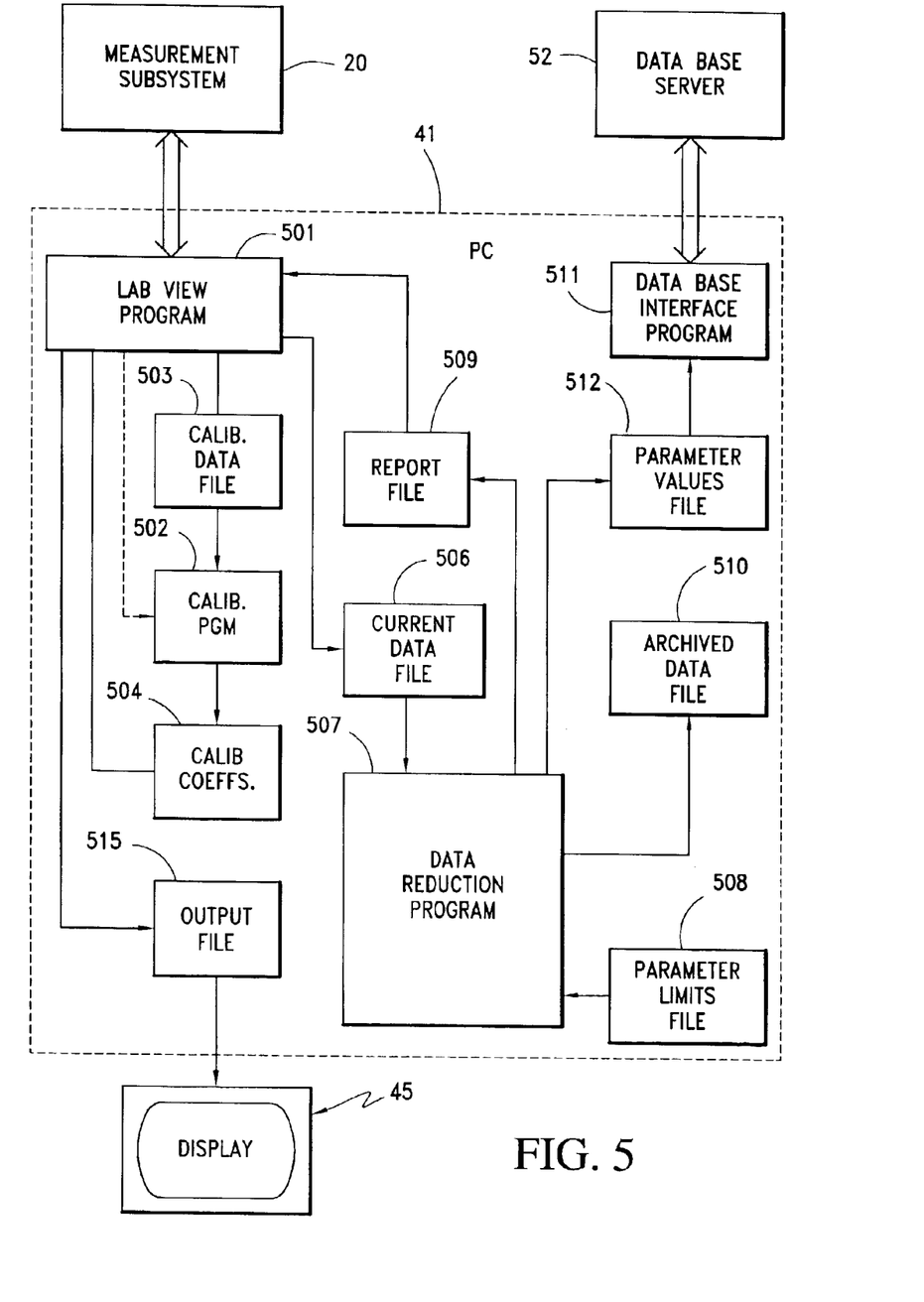
FIG. 5 shows a functional block diagram of the analysis apparatus of the lapping plate topography system, according to the present invention.

FIG. 5 provides a simplified functional block diagram of the lapping plate topography system. Blocks within PC 41 depict functions carried out by the processor 48 under the control of software downloaded as required from the hard disk memory 50 into the random access memory 49. Briefly, the functions of the blocks shown are as follows.

LABVIEW™ program 501 is a graphical programming language used for controlling and collecting data from computer compatible measurement equipment. LABVIEW™ is available from National Instruments Corporation of Austin, Tex. The program provides the necessary commands to the measurement apparatus 20 to control the positions of the spindle assembly, rotary arm assembly and measurement probe Z-drive according to predetermined measurement routines. The LABVIEW™ program also inputs the measured lapping plate data after it has been appropriately conditioned and formatted, stores the measured data for analysis, and outputs the results of the analysis to the display device 45 through output file 515.

Calibration program 502 runs the calibration routine, described above, under the general control of the LABVIEW™ program. It performs a regression analysis of the data collected during the calibration scan, which are stored in calibration date file 503, and stores the results in the calibration coefficients file 504 for later use in analyzing the current lapping plate data.

Current data file 506 provides storage of measured lapping plate data until the current data scan is complete and the data can be analyzed.

Data reduction program 507 performs an analysis of the measured lapping plate data in the current data file 506. The output of the data reduction program 507 is a set of parameters (discussed in further detail below) that characterize the topography of the lapping plate being measured and permits the operator to make a pass/fail decision regarding the article under test. Parameter limits file 508 stores values against which the data reduction program 507 compares each of the parameters. Data reduction program 507 outputs a report to report file 509 containing the computed parameters and pass/fail recommendations. Data reduction program 507 can also output a choice of graphical presentations (discussed in great detail below) of the lapping plate topographic data. The output of the data reduction program 507 is stored within the PC in archived data file 510.

Database interface program 511 controls the storage of measured parametric values for each lapping plate in a central database server 52. The parametric values generated by data reduction program 507 are temporarily stored in parametric values file 512 pending transfer to the database server 52.

It will be recognized by a person of ordinary skill in the art that the organization of the programs and files described above is only exemplary, and that the same functions can be performed by different arrangements of software and data storage resources.

Using the present invention, the process of measuring the surface topography of a lapping plate, analyzing the measured data, and displaying and storing the results, involves the following steps:

(1) Bringing the spindle assembly 22 to the load position after homing (see FIGS. 3a and 3b).
(2) Loading the lapping plate on the spindle with the drain hole pointed away from the operator (see FIG. 3b).
(3) Inputting command to start scanning.
(4) Performing a safety scan of the lapping plate. If the probe height measurement goes out of range during the safety scan, the Z-drive (i.e., probe assembly actuator) is automatically activated to raise the probe, the spindle is stopped, and the operator cued to re-level the lapping plate using leveling screws around the periphery of the spindle assembly.
(5) Performing a data scan of the lapping plate. This step involves reading in the $TC_0$ and $TC_1$ parameters from the calibration data file and correcting the measured probe height data. During the data scan the output device displays the number of rings on the lapping plate to completion and the time in seconds to completion.
(6) Upon completion of the data scan, returning the Z-drive and rotary arm assembly 23 to their home positions, and the spindle assembly 22 to its load position.
(7) Removing the lapping plate from the spindle assembly 22.
(8) Writing the measured data to the current data file 506 for data analysis.
(9) Reading the measured data from the current data file 506 and the parameter limits from the parameter limit file 508.
(10) Analyzing the measured data and calculating the lapping plate topographic parameters.
(11) Writing a report to the report file 509 for the Lab View program 501 to read out and display on the display device 45.
(12) Writing the analysis results to the archived data file 510.
(13) Writing the computed lapping plate parameters to the parameter values file 512.
(14) Reading the parameter data from the parameter values file, uploading the data to the data base server 52 and then erasing the parameter values file 512.

(15) Reading the report file 509, displaying the calculated parameters and the pass/fail determination for each parameter.

With the exception of the steps involving loading and removing the lapping plate from the spindle assembly, leveling the lapping plate and initiating the scanning process, all the steps described above are performed automatically by the lapping plate topography system under software control. No manual data reduction is required on the part of the operator to make a pass/fail determination.

The table below lists the parameters selected in the preferred embodiment to characterize the measured surface topography of each lapping plate for the purpose of making a pass/fail determination. The parameters were selected on the basis of the process requirements for lapping magnetic read/write heads for hard disk drives. However, it should be obvious to a person of ordinary skill in the art that other or additional parameters might be selected for other applications without affecting the general applicability of the disclosed invention.

| Plate Topographic Parameter | Units | Expected Range |
| --- | --- | --- |
| Plate Shape | none | 9 Different Shapes |
| Delaminations | No. of Radii | 0 to 999 |
| Pits and Peaks | No. of Radii | 0 to 99 |
| P-V Elevation | microns | 0.0 to 15.0 |
| Max Area | K mm$^2$ | 0.5 to 99 |
| Elevation @ Max Area | microns | 0.0 to 15.0 |
| Volume | mm$^3$ | 0.0 to 999.9 |
| Rq | microns | 0.0 to 9.999 |
| Rq3 | microns | 0.0 to 0.999 |
| Rq11 | microns | 0.0 to 0.999 |
| Average Planarization Error | microns$^2$ | 0.0 to 999.9 |
| Range Planarization Error | microns$^2$ | 0.0 to 999.9 |
| Engis Correction | microns | −5.0 to +5.0 |

A brief definition of each of these parameters follows.

Plate Shape—Shape definitions are based on a second order curve fit to the surface of the lapping plate using average measured height as a function of radius. Examples are concave and convex.

Delaminations—The number of measured concentric rings on the surface of the lapping plate affected by delaminations of the tin layer from the aluminum base. Delaminations typically result from voids in the resin system bonding the tin layer to the aluminum.

Pits and Peaks—The number of measured concentric rings affected with pits and peaks in the tin layer on the surface of the lapping plate. Pits can result, for example, from "tear outs" where the tin layer is machined very thin in the planarization process.

P-V Elevation—The maximum peak to valley elevation on the surface of the lapping plate.

Max Area—Maximum area of a plateau on the surface of the lapping plate of any given elevation.

Elevation @ Max Area—Elevation of the plateau identified as having Max Area.

Volume—Volume of the lapping plate above a flat plane.

Rq—Surface waviness rms for all harmonic frequencies based on Fourier analysis of measured height data from concentric rings on the lapping plate surface (discussing further detail below).

Rq3—Surface waviness rms for harmonic frequencies from 3 to 10.

Rq11—Surface waviness rms for harmonic frequencies from 11 to 150.

Average Planarization Error—Average deviation for 24 regions around the plate from regression planes defined by the charging ring contact.

Range Planarization Error—Range of the deviations from the 24 regions around the plate from regression planes defined by the charging ring contact.

Engis Correction—Engis deviation from flat plate. Engis is the manufacturer of the tool that faces the lapping plate.

Figure 6:
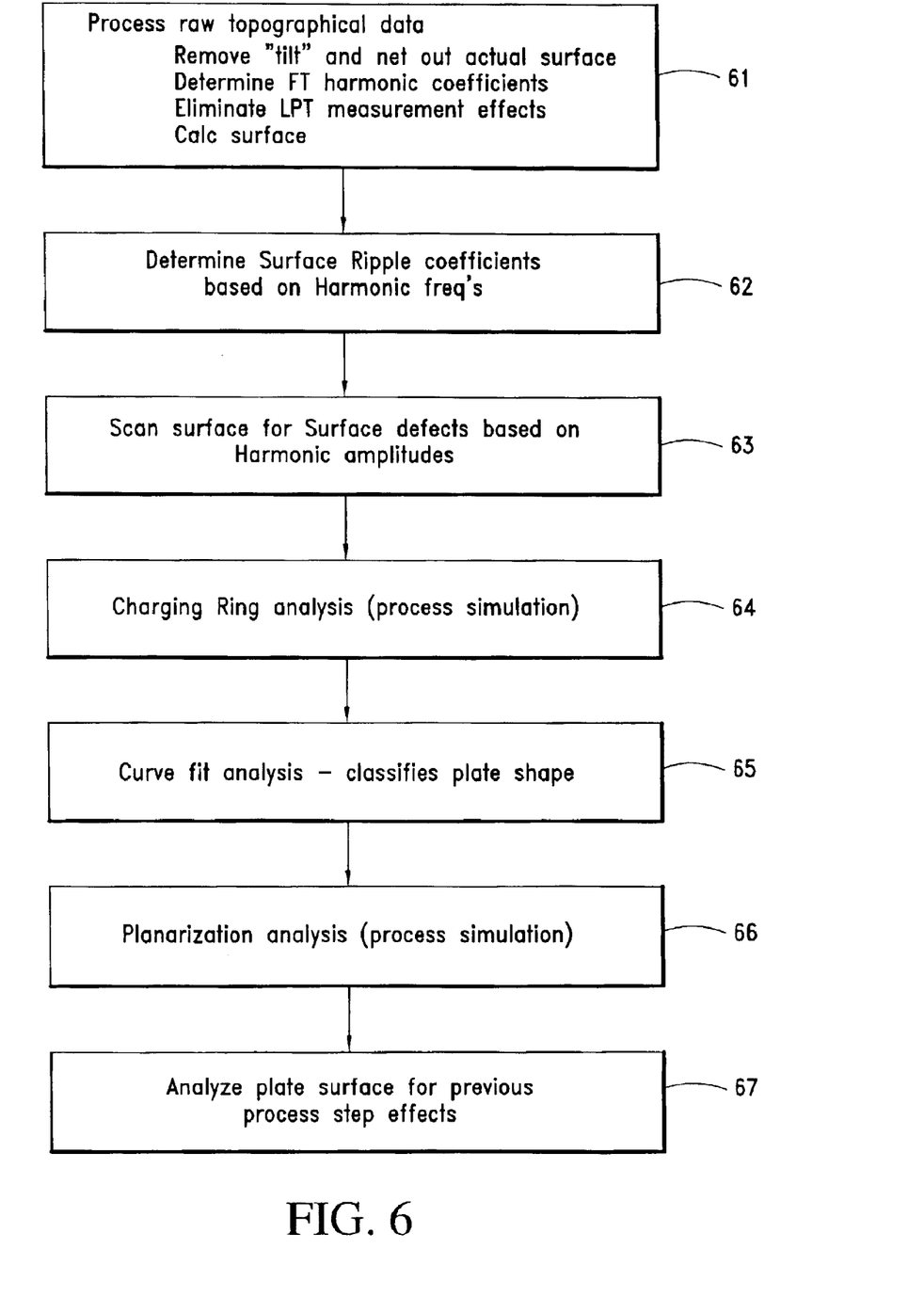
FIG. 6 shows a flow chart of the data reduction program, according to the present invention.

FIG. 6 is a flowchart that summarizes the calculations performed by the data reduction program. Processing of the raw topographic data occurs in step 61. This step includes: calculating and removing any "tilt" and netting out the actual surface; determining Fourier transform (FT) harmonic coefficients; eliminating LPT measurement effects; and calculating the surface. The use of a Fourier transform technique to analyze the topographic data advantageously converts the discrete measured data for each concentric ring on the surface into a series of polynomial coefficients. Taking the rms value of these coefficients, as indicated above, yields a useful measure of the waviness of the surface. Determination of the surface ripple parameters in this manner is indicated in step 62.

In step 63, a surface scan for surface defects is performed based on harmonic amplitudes. Step 64 is a charging ring analysis to simulate the charging process. In step 65, a second-order curve fit analysis is performed to classify the plate shape. Step 66 is a planarization analysis to simulate the planarization process. Step 67 is a plate surface analysis to evalute previous process step effects.

Figure 7:
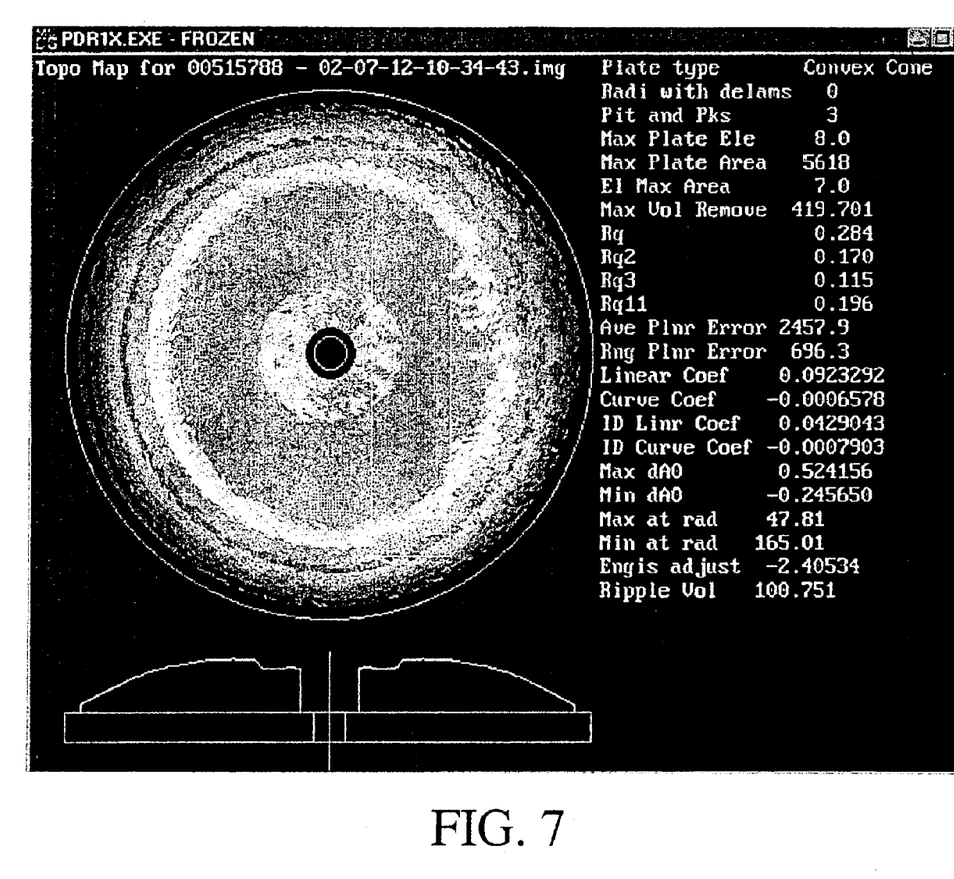
FIG. 7 shows a topographical map of a typical lapping plate, displayed by the present invention.

In addition to reporting the selected plate parameters listed in the table above and proving a pass/fail recommendation for each plate based on the measured parameters and predetermined parameter limit values, the data reduction program is configured to provide various graphical outputs that are useful in characterizing the plate surface. For example, FIG. 7 shows a topographical map for a typical lapping plate, derived from measured height data. In addition, the display in FIG. 7 shows the plate cross-section and the calculated parameters for the surface, making the display a useful one for quickly visualizing the surface and evaluating its suitability for use.

Figure 8:
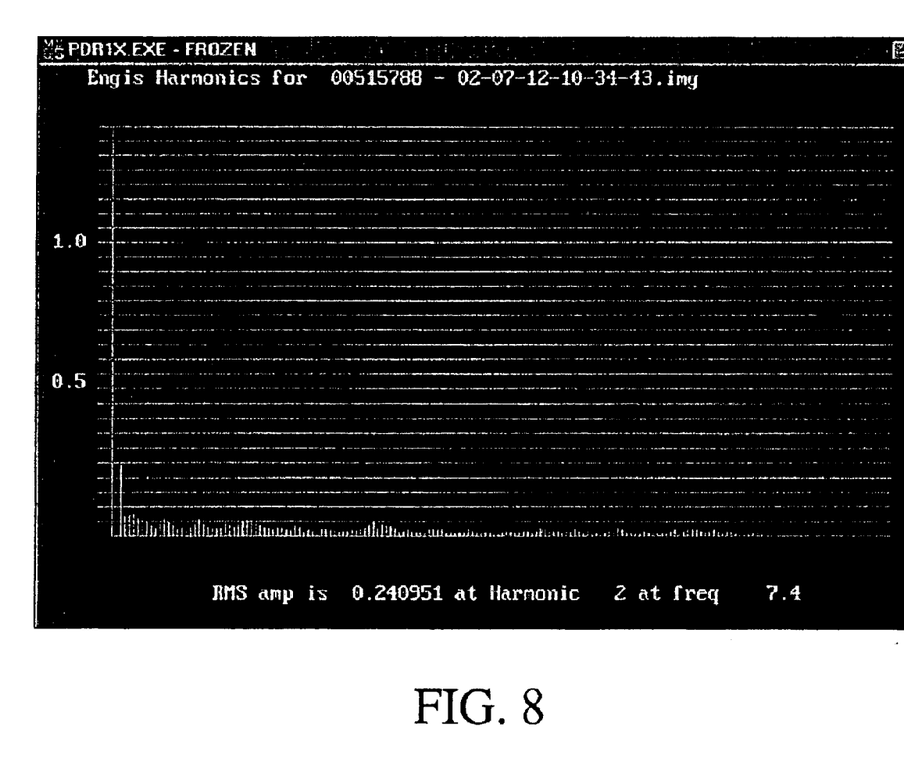
FIG. 8 shows a Fourier transform harmonic coefficient analysis of a typical lapping plate, displayed by the present invention.

FIG. 8 is an example of a graph showing the results of a typical harmonic analysis performed on a plate surface. Other useful representations, such as a 3-D mesh of the plate surface (not shown) can also be generated from the measured data.

It should be understood that the invention is not necessarily limited to the specific process, arrangement, materials and components shown and described above, but may be susceptible to numerous variations within the scope of the invention. For example, although the above-described exemplary aspects of the invention are believed to be particularly well suited for the measurement and topographic analysis of lapping plates it is contemplated that the concepts of the present invention can be applied in other applications. For example, the concepts of the present application can be utilized whenever it is desired to characterize the surface of any object generally having a circular shape.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed:

1. An apparatus for topographic measurement of a surface of a lapping plate, comprising:

a probe for measuring a height of the surface at a plurality of measurement points each having a radial position and an angular position on the surface of the lapping plate;

a rotary arm assembly for moving the probe, which is attached thereto, in an arc over the surface of the lapping plate such that the probe can be positioned at a sequence of radial distances relative to a center of the lapping plate that correspond to the radial positions of the plurality of measurement points; and a spindle assembly for rotating the lapping plate about the center of the lapping plate such that the probe can be positioned over a sequence of angular positions on the lapping plate that correspond to the angular positions of the plurality of measurement points.

2. The measurement apparatus according to claim 1, wherein the probe is slideably attached to the rotary arm assembly by a probe actuator such that the probe can be moved toward and away from the surface of the lapping plate in a direction nominally perpendicular to the surface of the lapping plate.

3. The measurement apparatus according to claim 2 wherein each of the rotary arm assembly, the spindle assembly and the probe actuator is electrically driven.

4. The measurement apparatus according to claim 2, wherein each of the rotary arm assembly, the spindle assembly and the probe actuator includes an electrical position sensor.

5. The measurement apparatus according to claim 2, wherein each of the rotary arm assembly, the spindle assembly and the probe actuator is computer compatible for position control and measurement.

6. The measurement apparatus according to claim 1, wherein the probe is a non-contacting capacitive probe.

7. The measurement apparatus according to claim 1, wherein the rotary arm assembly and the spindle assembly rotate on air bearings.

8. An apparatus for analyzing topographic data of a surface of a lapping plate, comprising:

a computer readable medium; and computer programming stored in the medium;

wherein the stored computer programming is configured to be readable from the computer readable medium by a computer to thereby cause the computer to operate so as to:

input topographic data measured at a plurality of data points on the surface of the lapping plate as a function of angular position and radial distance from a center of the lapping plate;

calculate Fourier transform harmonic coefficients based on the inputted topographic data;

calculate surface ripple coefficients based on the calculated Fourier transform harmonic coefficients; and output the calculated surface ripple coefficients.

9. The analysis apparatus according to claim 8, wherein each of the surface ripple coefficients is calculated as the root-mean-square of selected ones of the Fourier transform harmonic coefficients.

10. The analysis apparatus according to claim 8, wherein the Fourier transform harmonic coefficients are calculated separately for each value of the radial distance from the center of the lapping plate.

11. The analysis apparatus according to claim 8, wherein the stored computer programming further causes the computer to compare the calculated surface ripple coefficients to stored limit values and output a pass/fail indication based on the comparison.

12. The analysis apparatus according to claim 8, wherein the topographic data is a height of the surface of the lapping plate at each of the plurality of data points.

13. The analysis apparatus according to claim 12, wherein the stored computer programming further causes the computer to apply a correction to the inputted topographic data based on topographic measurements of an optical flat.

14. The analysis apparatus according to claim 12, wherein the stored computer programming further causes the computer to determine a shape of the surface of the lapping plate based on a second-order regression analysis of the measured topographic data, and to output an indication of the shape.

15. The analysis apparatus according to claim 12, wherein the stored computer programming further causes the computer to calculate and output a topographical map of the surface of the lapping plate based on the measured topographic data.

16. The analysis apparatus according to claim 12, wherein the stored computer programming further causes the computer to calculate and output a 3-D mesh representation of the surface of the lapping plate based on the measured topographic data.

17. A system for measuring and analyzing the surface topography of a lapping plate, comprising:

a measurement apparatus having a capacitive probe for measuring a height of the surface of the lapping plate, a rotary arm assembly for moving the probe, which is attached thereto, in an arc over the surface of the lapping plate such that the probe can be positioned at a plurality of radial distances from a center of the lapping plate, and a spindle assembly for rotating the lapping plate about the center of the lapping plate such that the probe can be positioned over a plurality of angular positions on the lapping plate; and a computer-based analysis apparatus operable to:

input the measured height at a plurality of data points on the surface of the lapping plate corresponding to the plurality of angular positions and the plurality of radial distances from the center of the lapping plate;

calculate Fourier transform harmonic coefficients based on the plurality of measured heights;

calculate surface ripple coefficients based on the calculated Fourier transform harmonic coefficients; and output the calculated surface ripple coefficients.

18. The topography system according to claim 17, wherein each of the surface ripple coefficients is calculated as the root-mean-square of selected ones of the Fourier transform harmonic coefficients.

19. The topography system according to claim 17, wherein the Fourier transform harmonic coefficients are calculated separately for each value of the radial distance from the center of the lapping plate.

20. The topography system according to claim 17, wherein the computer-based analysis apparatus is further operable to compare the calculated surface ripple coefficients to stored limit values and output a pass/fail indication based on the comparison.

* * * * *